United States Patent
Spagnuolo et al.

(10) Patent No.: US 6,286,382 B1
(45) Date of Patent: Sep. 11, 2001

(54) RACK AND PINION STEERING GEAR AND METHOD OF MANUFACTURING THE GEAR

(75) Inventors: Steven P. Spagnuolo, Maryville; Kenneth N. Douglass, Knoxville, both of TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/455,073

(22) Filed: Dec. 6, 1999

(51) Int. Cl.⁷ ............... B62D 3/12; B23G 7/00; F16B 39/02

(52) U.S. Cl. ............... 74/422; 74/498; 411/214; 411/403; 411/410; 470/1

(58) Field of Search ............... 74/422, 498; 411/214, 411/403, 410; 470/1

(56) References Cited

U.S. PATENT DOCUMENTS

| | | | |
|---|---|---|---|
| 5,718,149 | * | 2/1998 | Phillips .................. 74/422 |
| 6,053,670 | * | 4/2000 | Schmid .................. 411/214 X |
| 6,119,540 | * | 9/2000 | Phillips .................. 74/422 |

* cited by examiner

Primary Examiner—Allan D. Herrmann
(74) Attorney, Agent, or Firm—Tarolli, Sundheim, Covell, Tummino & Szabo L.L.P.

(57) ABSTRACT

A rack and pinion steering gear (10) comprises a rack (14) and a housing (12) for receiving the rack. The housing (12) has a chamber (42) for receiving a rack supporting yoke (70). The chamber (42) has a threaded portion (44) with internal threads (45). A rack supporting yoke (70) is disposed in the chamber (42) and supports the rack (14) for movement in the housing (12). An externally threaded yoke plug (90) is screwed into the internal threads (45) of the threaded portion (44). An externally threaded lock nut (120) is screwed into the internal threads (45) of the threaded portion (44) and into abutting engagement with the yoke plug (90) to lock the yoke plug in the housing (12).

2 Claims, 3 Drawing Sheets

RACK AND PINION STEERING GEAR AND METHOD OF MANUFACTURING THE GEAR

TECHNICAL FIELD

The present invention relates to a rack and pinion steering gear and a method of manufacturing a rack and pinion steering gear for use in turning steerable wheels.

BACKGROUND OF THE INVENTION

A known rack and pinion steering gear for use in turning steerable wheels of a vehicle includes a pinion which is disposed within a housing and which is operatively coupled with a vehicle steering wheel. A transversely extending rack is also disposed within the housing and is in meshing engagement with the pinion. Rotation of the steering wheel produces linear movement of the rack which causes the steerable wheels to turn laterally of the vehicle.

In the known rack and pinion steering gear, a yoke presses the rack into engagement with the pinion. The yoke is typically secured in the housing by a yoke plug which screws into the housing over an outboard end of the yoke. A helical spring is disposed between the yoke plug and the yoke to ensure firm meshing engagement between teeth on the rack and teeth on the pinion.

Various methods have been proposed for retaining the yoke plug in the housing in order to maintain the position of the yoke against the rack inside the housing.

SUMMARY OF THE INVENTION

In accordance with the present invention, a rack and pinion steering gear comprises a rack and a housing for receiving the rack. The housing has a chamber for receiving a rack supporting yoke. The chamber has a threaded portion with internal threads. A rack supporting yoke is disposed in the chamber and supports the rack for movement in the housing. An externally threaded yoke plug is screwed into the internal threads of the threaded portion of the chamber. An externally threaded lock nut is screwed into the internal threads and into abutting engagement with the yoke plug to lock the yoke plug in the housing.

BRIEF DESCRIPTION OF THE DRAWINGS

The foregoing and other features of the present invention will become apparent to those skilled in the art to which the present invention relates upon reading the following description with reference to the accompanying drawings, wherein.

DESCRIPTION OF PREFERRED EMBODIMENTS

Figure 1:
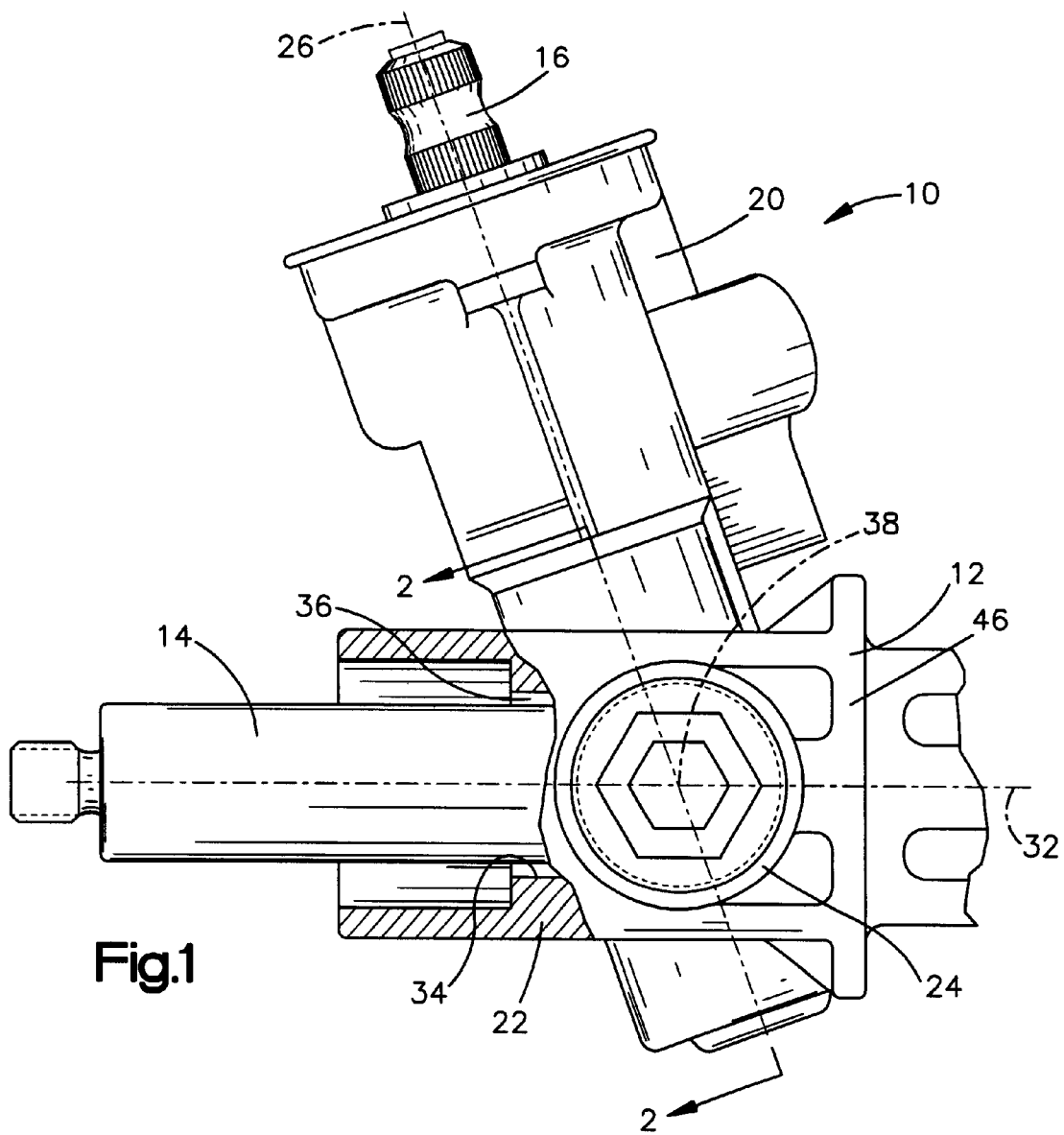
FIG. 1 is a side view, partially in section, of a portion of a rack and pinion steering gear.

As representative of the present invention, FIG. 1 illustrates a rack and pinion steering gear 10 which includes a housing 12, a rack 14, and a pinion 16.

Figure 2:
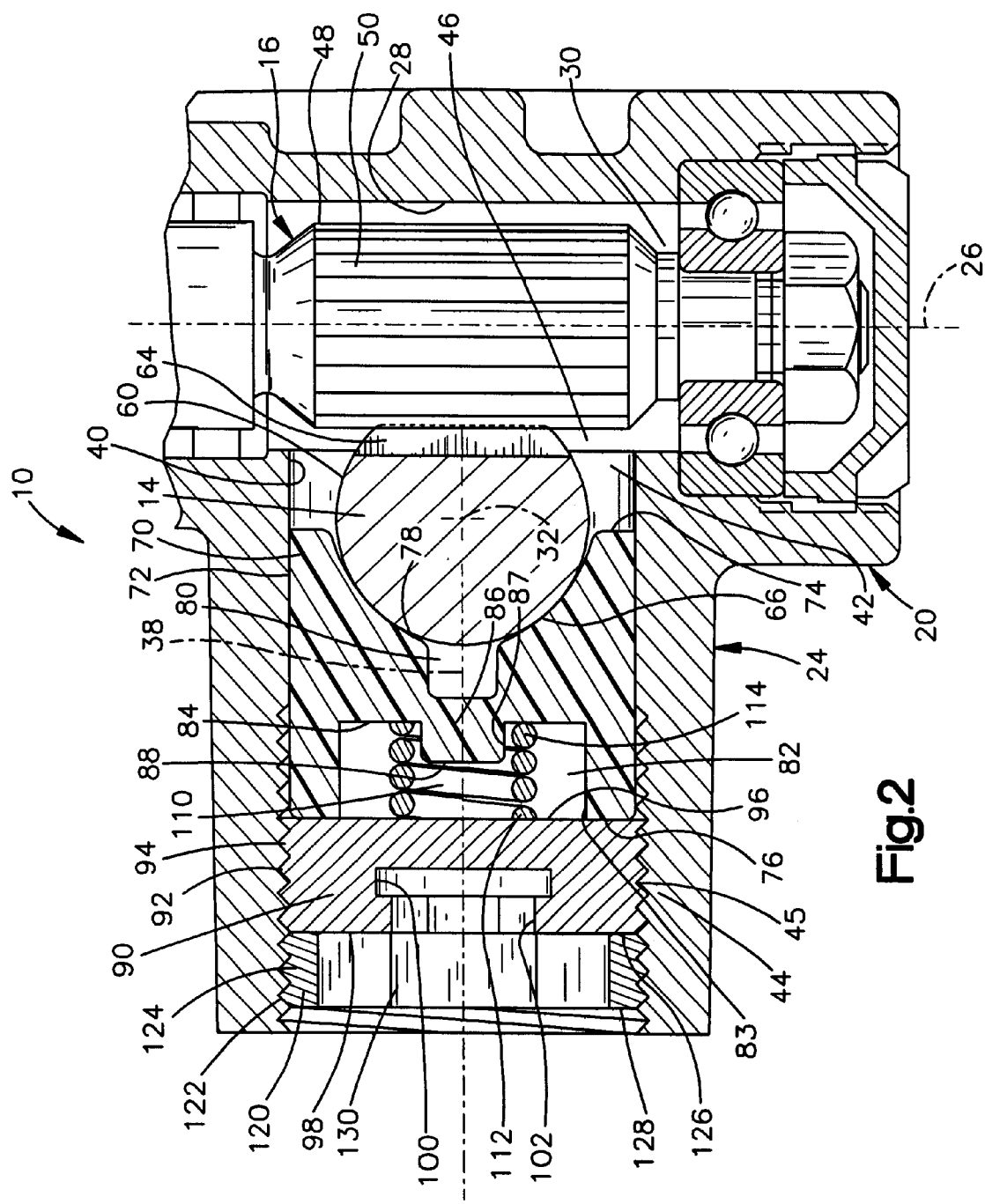
FIG. 2 is a sectional view taken generally along line 2—2 in FIG. 1.

The housing 12 includes a pinion portion 20, a rack portion 22, and a yoke portion 24. The pinion portion 20 has an axis 26 and includes an inner surface 28 (FIG. 2) that defines a pinion chamber 30 in the housing 12. The rack portion 22 (FIG. 1) has an axis 32 which extends transverse to the axis 26. The rack portion 22 has an inner surface 34 that defines a rack chamber 36 in the housing 12. The yoke portion 24 is centered on a yoke axis 38 which extends transverse to the axis 26 and perpendicular to the axis 32. The yoke portion 24 has an inner surface 40 (FIG. 2) that defines a yoke chamber 42 in the housing 12. The inner surface 40 of the yoke portion 24 includes a threaded portion 44 having internal threads 45. The pinion chamber 30, the rack chamber 36 (FIG. 1), and the yoke chamber 42 (FIG. 2) intersect in a junction section 46 of the housing 12.

The pinion 16 is disposed in the pinion chamber 30 and is rotatable about the axis 26. The pinion 16 is operatively connected with a vehicle steering wheel (not shown) as is known in the art. The pinion 16 has an outer surface 48 which includes gear teeth 50.

The rack 14 is partially disposed in the rack chamber 36 (FIG. 1). Opposite ends (not shown) of the rack 14 project beyond the housing 12 and are adapted to be connected with steerable vehicle wheels (not shown) as is known in the art. The rack 14 is movable in opposite directions along the axis 32 to effect turning of the steerable wheels in opposite directions.

The rack 14 (FIG. 2) has a generally cylindrical outer surface 60. A portion of the outer surface 60 of the rack 14 includes rack teeth 64. The rack teeth 64 mesh with the gear teeth 50 on the pinion 16 in the junction section 46 of the housing 12. The outer surface 60 of the rack 14 comprises a cylindrical surface portion 66 which is diametrically opposite the rack teeth 64.

The steering gear 10 further includes a yoke 70, a yoke plug 90, a yoke spring 110, and a lock nut 120. The yoke 70 is centered on the yoke axis 38 and is disposed in the yoke chamber 42. The yoke 70 has a cylindrical outer surface 72 and first and second opposite end surfaces 74 and 76, respectively. The outer surface 72 is complimentary to the inner surface 40 of the yoke chamber 42. The first end surface 74 includes a concave surface 78 centered on the yoke axis 38. A recess 80 is formed in the concave surface 78 and is centered on the yoke axis 38.

The second end surface 76 of the yoke 70 includes an annular spring cavity 82 which is centered on the yoke axis 38 and defined by a cylindrical side wall 83 and an end wall 84. A cylindrical spring pilot 86 projects from the end wall 84 and into the spring cavity 82. The spring pilot 86 is centered on the yoke axis 38 and includes first and second pilot surfaces 87 and 88 which further define the spring cavity 82.

The yoke plug 90 is centered on the yoke axis 38 and is disposed in the yoke chamber 42 in the housing 12. The yoke plug 90 includes an outer surface 92 having external threads 94 which mate with the threaded portion 44 of the inner surface 40 of the yoke chamber 42. The yoke plug 90 has an inner end wall 96 and an opposite outer end wall 98. The yoke plug 90 includes a cylindrical undercut portion 100 which is centered on the yoke axis 38 and disposed between the inner end wall 96 and the outer end wall 98. A hexagonal inner surface 102 is centered on the yoke axis 38 and extends from the undercut portion 100 to the outer end wall 98. The outer end wall 98 extends radially between the hexagonal inner surface 102 and the outer surface 92 of the yoke plug 70.

The lock nut 120 is centered on the yoke axis 38 and is disposed in the yoke chamber 42. The lock nut 120 includes an outer surface 122 having external threads 124 that mate with the threaded portion 44 of the inner surface 40 of the yoke chamber 42. The lock nut 120 has an inner end wall 126 and an opposite outer end wall 128. The lock nut 120 further includes a hexagonal inner surface 130 which extends axially through the lock nut, between the inner and outer end walls 126 and 128. The inner and outer end walls 126 and 128 extend radially between the inner surface 130 and the outer surface 122 of the lock nut 120.

The yoke spring 110 is centered on the yoke axis 38 and is disposed between the yoke 70 and the yoke plug 90. The yoke spring 110 comprises a helical spring which fits over the spring pilot 86 on the yoke 70. A first end 114 of the yoke spring 110 engages end wall 84 of the yoke 70. A second end 112 of the yoke spring 110 engages the inner end wall 96 of the yoke plug 90. The yoke spring 110 biases the yoke 70 toward the rack 14.

The inner end wall 126 of the lock nut 120 is in abutting engagement with the outer end wall 98 of the yoke plug 90. The lock nut 120 helps to prevent the yoke plug 90 from loosening or becoming unscrewed. A thread sealant (not shown) may be applied to the threads 94 on the yoke plug 90. The sealant helps to seal the yoke chamber 42 from the outside environment. The sealant may also help to prevent the yoke plug 90 from loosening or becoming unscrewed.

The hexagonal inner surfaces 102 and 130 of the yoke plug 90 and the lock nut 120, respectively, allow the yoke plug and the lock nut to be tightened or loosened by tools (not shown) such as hexagonal wrenches. The hexagonal inner surface 130 of the lock nut 120 has larger internal dimensions than the hexagonal inner surface 102 of the yoke plug 90. This allows a tool to extend through the hexagonal inner surface 130 of the lock nut 120 and be inserted into the hexagonal inner surface 102 of the yoke plug 90. The tool can thus be rotated to tighten or loosen the yoke plug 90 when the lock nut 120 is positioned in the yoke chamber 42 adjacent to the yoke plug without tightening or loosening the lock nut 120.

Figure 3:
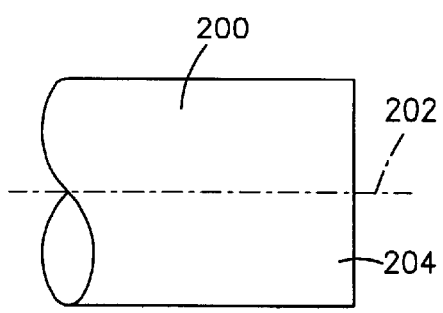
FIGS. 3–9 are side views, partially in section, depicting steps used in making parts of the rack and pinion steering gear of FIG. 1.

The external threads 94 of the yoke plug 90 and the external threads 124 of the lock nut 120 have the same crest diameter, root diameter, and pitch. This allows the yoke plug 90 and the lock nut 120 to be made concurrently, from a single piece of material. As illustrated in FIG. 3, a blank 200, such as a piece of unmachined cylindrical stock material, is provided. The blank 200 is made of a metal material, such as steel or aluminum, and includes an axis 202 and an end portion 204.

Figure 4:
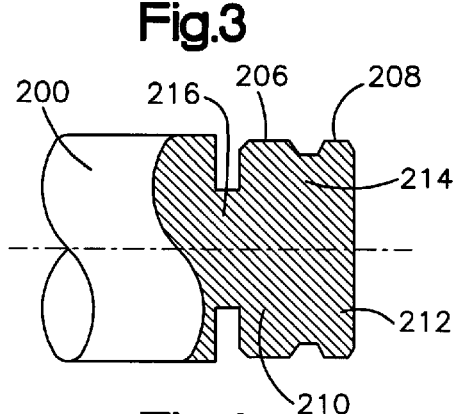
Figure 5:
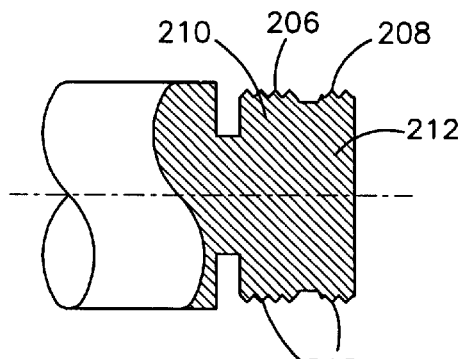

As illustrated in FIG. 4, the blank 200 is machined by known means to form outer cylindrical surfaces 206 and 208, respectively, of a yoke plug portion 210 and a lock nut portion 212 of the blank 200. The yoke plug portion 210 and the lock nut portion 212 are centered on the axis 202 and separated by a first portion 214 of the blank 200. A second portion 216 separates the yoke plug portion 210 from the remainder of the blank 200. External threads 218 (FIG. 5) are then machined on the outer surfaces 206 and 208 of the yoke plug portion 210 and the lock nut portion 212, respectively.

Figure 6:
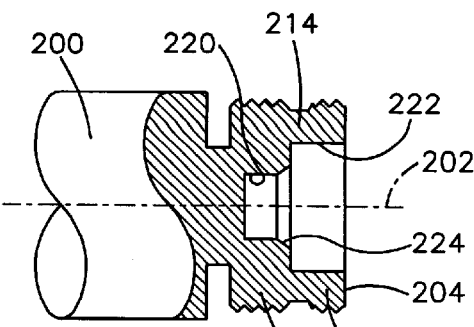

As illustrated in FIG. 6, the blank 200 is next machined to form first and second inner cylindrical surfaces 220 and 222 which are centered on the axis 202. The first cylindrical surface 220 has a first diameter and extends from the first portion 214 into the yoke plug portion 210. The second cylindrical surface 222 has a second diameter, greater than the first diameter, and extends from the end portion 204 of the blank 200 through the lock nut portion 212 to the first cylindrical surface 220. A tapered portion 224 may extend between the first and second cylindrical surfaces 220 and 222.

Figure 7:
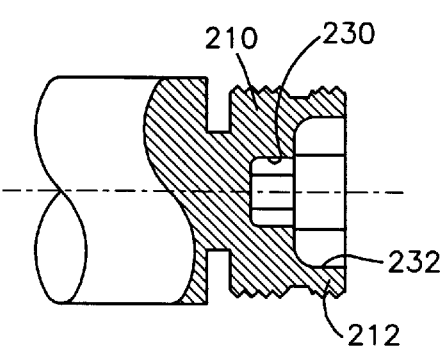
Figure 8:
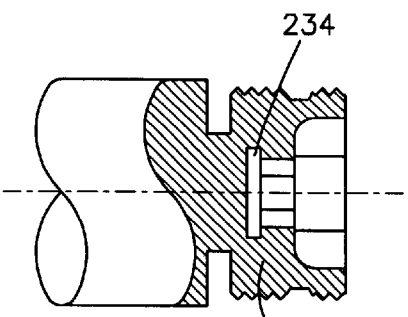

The first and second cylindrical surfaces 220 and 222 are then finished to form a hexagonal inner surface 230 (FIG. 7) of the yoke plug portion 210 and a hexagonal inner surface 232 of the lock nut portion 212. An undercut portion 234 (FIG. 8) is then machined in the yoke plug portion 210.

Figure 9:
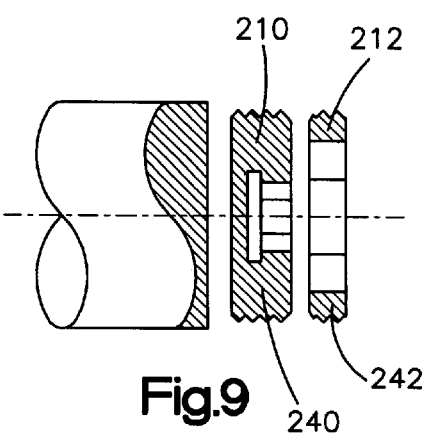

The first and second portions 214 and 216 are then removed, thus separating the yoke plug portion 210 (FIG. 9) and the lock nut portion 212 from the blank 200 and from each other. As a result, a yoke plug 240 and a lock nut 242 are produced. The yoke plug 240 and the lock nut 242 in FIG. 9 are identical to the yoke plug 90 and the lock nut 120 of FIG. 2. Thus, the yoke plug portion 210 and the lock nut portion 212 are machined like the yoke plug 90 and the lock nut 120, respectively.

From the above description of the invention, those skilled in the art will perceive improvements, changes and modifications. Such improvements, changes and modifications within the skill of the art are intended to be covered by the appended claims.

What is claimed is:

1. A rack and pinion steering gear comprising:

a rack;

a housing receiving said rack, said housing having a chamber for receiving a rack supporting yoke, said chamber having a chamber portion with internal threads;

a rack supporting yoke in said chamber and supporting said rack for movement in said housing;

an externally threaded yoke plug screwed into the internal threads of said chamber portion; and an externally threaded lock nut screwed into the internal threads of said chamber portion and into abutting engagement with said yoke plug to lock said yoke plug in said housing;

wherein said yoke plug and said lock nut are made from an unmachined cylindrical blank, said blank being machined to shape a first portion of said blank like said yoke plug, said blank being machined to shape a second portion of said blank like said lock nut, said first and second portions being subsequently separated from said blank and from each other.

2. A method of manufacturing a rack and pinion steering gear which includes a housing, a rack in the housing, a yoke in the housing supporting the rack for movement in the housing, a yoke plug threaded into the housing to support the yoke in the housing, and a threaded lock nut for locking the yoke plug in the housing, said method comprising the steps of:

providing a housing and a rack located in the housing, said housing having a chamber for receiving a rack supporting yoke, the chamber having a chamber portion with internal threads;

positioning a rack supporting yoke in said chamber;

providing an externally threaded yoke plug;

screwing said yoke plug into the internal threads of said chamber portion;

providing an externally threaded lock nut; and screwing said externally threaded lock nut into the internal threads of said chamber portion and into abutting engagement with said yoke plug;

wherein said steps of providing an externally threaded yoke plug and providing an externally threaded lock nut include the steps of providing an unmachined cylindrical blank, machining and threading said blank to shape a first portion of said blank like said yoke plug and to shape a second portion of said blank like said lock nut; and separating said first and second portions from said blank and from each other.

* * * * *